(12) United States Patent
Shintani et al.

(10) Patent No.: US 8,514,313 B2
(45) Date of Patent: Aug. 20, 2013

(54) IMAGING DEVICE AND METHOD FOR SWITCHING MODE OF IMAGING DEVICE

(75) Inventors: Koichi Shintani, Hachioji (JP); Yoko Saito, Hachioji (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 486 days.

(21) Appl. No.: 12/721,332

(22) Filed: Mar. 10, 2010

(65) Prior Publication Data

US 2010/0231777 A1    Sep. 16, 2010

(30) Foreign Application Priority Data

Mar. 13, 2009    (JP) .................................. 2009-061177

(51) Int. Cl.
*H04N 5/222*    (2006.01)

(52) U.S. Cl.
USPC ............. 348/333.01; 348/333.02; 348/333.12

(58) Field of Classification Search
USPC ........... 348/333.01, 333.02, 333.12; 345/158
See application file for complete search history.

(56) References Cited

U.S. PATENT DOCUMENTS

| 2001/0007469 A1* | 7/2001 | Fuchimukai et al. ......... 348/208 |
| 2003/0098847 A1* | 5/2003 | Yamamoto .................... 345/158 |
| 2009/0085865 A1* | 4/2009 | Fattah ........................... 345/156 |

FOREIGN PATENT DOCUMENTS

| JP | 2005-057378 | 3/2005 |
| JP | 2005-236883 | 9/2005 |
| JP | 4009887 | 9/2007 |

* cited by examiner

*Primary Examiner* — Yogesh Aggarwal
(74) *Attorney, Agent, or Firm* — John C. Pokotylo; Straub & Pokotylo

(57) ABSTRACT

An imaging device includes an imaging unit that takes an image; a display unit that displays the image taken by the imaging unit and displays a menu of selectable modes in accordance with a change in a position of the imaging device; and an operation detecting unit that detects a position or a direction of an operation applied to the imaging device. The imaging device also includes a control unit that determines the position or the direction of the operation detected by the operation detecting unit and performs control to switch a mode in accordance with a correspondence between the position or the direction of the operation and the menu displayed on the display unit.

2 Claims, 16 Drawing Sheets

IMAGING DEVICE AND METHOD FOR SWITCHING MODE OF IMAGING DEVICE

CROSS-REFERENCE TO RELATED APPLICATIONS

This application is based upon and claims the benefit of priority from Japanese Patent Application No. 2009-061177, filed on Mar. 13, 2009, the entire contents of which are incorporated herein by reference.

BACKGROUND OF THE INVENTION

1. Field of the Invention

The present invention relates to an imaging device, such as a digital camera, a digital video camera, or a mobile phone with a digital camera, and a method for switching a mode of the imaging device.

2. Description of the Related Art

In imaging devices, such as digital cameras, digital video cameras, or mobile phones with digital cameras, an image of an object is formed on an imaging element via a shooting lens and is subjected to photoelectric conversion and digitization. The imaging device has a function of taking still images and moving images so that the still images or the moving images can be easily taken by mode switching.

If still-image shooting or moving-image shooting is set by a mode setting by selecting a switch, it is inevitable that photo opportunities will be lost. Therefore, an imaging device is known that simultaneously performs still-image shooting and moving-image shooting (for example, Japanese Laid-open Patent Publication No. 2005-057378). However, because the amount of image data is huge during simultaneous shooting of still images and moving images, it is troublesome to organize images. Therefore, generally, still-image shooting or moving-image shooting is performed after setting a still-image or moving-image mode by performing mode switching using a switch.

Not only switching between the shooting modes of still images and moving images but also switching between the shooting modes of still images and continuous shooting is performed. Furthermore, the shooting mode is switched to a reproduction mode so that shot images are reproduced on a liquid crystal display in the reproduction mode. Moreover, switching to zoom shooting is performed so that expanded or wide-angle still images or moving images are taken.

In a recent imaging device, it is possible to set a number of shooting modes in consideration of an object, a shooting environment, or the like. For example, shooting modes for portrait shooting (suitable for shooting a person), night view (suitable for shooting a night view such as illuminated buildings), snapshot (suitable for shooting people with a landscape), landscape (suitable for shooting landscape at a long distance), beach/snow (suitable for shooting the seaside or snowcapped mountains), party shot (suitable for indoor shooting with strobe light reaching a long distance), or the like, are prepared in a menu mode, and it is possible to switch from a program auto as a default setting to any of these shooting modes.

Determination of exposure is a major shooting factor for taking clear pictures. For example, a strobe emits light if the exposure cannot be sufficiently obtained with natural light and, during shooting of a night view, exposure adjustment is performed such that the exposure time is changed for prolonged exposure. For the control of the strobe, the strobe auto is set as a default setting to switch emission in accordance with brightness and, if the strobe is caused to forcibly emit light independently of the exposure with natural light or the strobe emission is prohibited, the photographer changes the setting to switch from the strobe auto as the default setting to the strobe ON or the strobe OFF. For example, in facilities such as museums or galleries, where shooting with a strobe is prohibited although shooting is allowed, it is necessary to set the forced OFF (the strobe OFF) of the strobe. Furthermore, the strobe OFF is set for continuous shooting or moving images.

As described above, for shooting with the imaging device, it is necessary to perform a mode switching operation for switching among shooting modes for still images, moving images, and continuous shooting, switching from the shooting mode to the reproduction mode, switching from the program auto to the portrait shooting, or the like, switching from the strobe auto to the strobe ON or the strobe OFF, or the like. Usually, mode switching is performed by operating a switch, a touch panel, or the like, located on the outer covering of the imaging device.

In an imaging device, most switches (changeover switches) for mode switching as well as a release switch are located on the right side of the imaging device. Specifically, a general layout is such that the release switch is located on the right side of the upper surface of the imaging device, a liquid crystal display is located on the left side of the back surface of the imaging device, and most changeover switches are located on the right side of the back surface.

The imaging device is held by the left hand and a changeover switch is operated by the right hand so that the mode is switched.

In the case of one-handed operation, a changeover switch is operated by the right hand while the imaging device is held by the right hand. During the one-handed operation, for example, the index finger of the right hand remains on the upper surface of the imaging device, the front surface of the imaging device is held with the third finger, the fourth finger, and the fifth finger, and the back surface is held with the thumb and the palm, whereby the imaging device is held such that the front and the back surfaces are sandwiched between the third finger, the fourth finger, the fifth finger, and the thumb. Thus, if the changeover switch is operated with the thumb, the holding force from the back surface is decreased and the imaging device is held unstably. Furthermore, if the changeover switch on the back surface is operated with the index finger that remains on the upper surface of the imaging device, the imaging device is held unstably because the operation has to be performed with impractical finger arrangement and, because the index finger is removed from the release switch, it is difficult to promptly perform shooting and a photo opportunity can be lost.

In practice, it is not easy to operate the changeover switch by the right hand while holding the imaging device by the right hand and one-handed operation is hardly performed; therefore, two-handed operation is generally performed to operate the changeover switch by the right hand while holding the imaging device by the left hand.

Japanese Laid-open Patent Publication No. 2005-236883 discloses an imaging device in which mode switching can be performed while the imaging device is held by one hand, wherein a shooting mode and a reproduction mode can be switched while in a shooting position. Specifically, the configuration is such that the imaging device incorporates a shooting-position detection sensor so that the shooting mode is set if it is in the horizontal shooting position (if the imaging device is held horizontally) and the reproduction mode is set if it is in the vertical shooting position (if the imaging device is held vertically).

Furthermore, Japanese Laid-open Patent Publication No. 2005-236883 also discloses a configuration in which the shooting mode is set if it is in the horizontal shooting position and the reproduction mode is set if it returns to the horizontal shooting position within a predetermined time after it is in the vertical shooting position.

With the configuration disclosed in Japanese Laid-open Patent Publication No. 2005-236883, the shooting mode and the reproduction mode can be switched while the imaging device is held by one hand without operating a switch, whereby mode switching can be performed by the one-handed operation. However, a display unit such as a liquid crystal display (LCD) located on the back surface of the imaging device usually has a landscape-oriented screen and, if the imaging device is held vertically, the display screen is portrait-oriented. Therefore, in a configuration where the reproduction mode is set if the imaging device is held horizontally, a landscape-oriented shot image that is taken by the horizontally held imaging device is reproduced on the portrait-oriented liquid crystal display, which results in a display that is difficult and uncomfortable to view.

It is an object of the present invention to provide an imaging device that allows mode switching by one-handed operation with a technical idea that is different from a publicly known technical idea that allows switching between the shooting mode and the reproduction mode by changing the shooting position.

Specifically, it is an object to provide an imaging device that can definitely perform a switching operation corresponding to various scenes by using in combination an operation with a definite intention, such as a user's intentional tap operation for applying acceleration with a high frequency, and various operations such as the motion (for example, shake) of a device.

SUMMARY OF THE INVENTION

A method according to an aspect of the present invention is for switching a mode of an imaging device, the imaging device including an imaging unit that takes an image and a display unit that displays the image taken by the imaging unit. The method includes detecting a position of the imaging device; displaying a menu of selectable modes on the display unit in a switchable manner; detecting a position or a direction of an operation applied to the imaging device; and switching a mode in accordance with a correspondence between the detected position or direction of the operation and the menu displayed on the display unit.

An imaging device according to another aspect of the present invention includes an imaging unit that takes an image; a display unit that displays the image taken by the imaging unit and displays a menu of selectable modes in accordance with a change in a position of the imaging device; an operation detecting unit that detects a position or a direction of an operation applied to the imaging device; and a control unit that determines the position or the direction of the operation detected by the operation detecting unit and performs control to switch a mode in accordance with a correspondence between the position or the direction of the operation and the menu displayed on the display unit.

An imaging device according to still another aspect of the present invention includes an imaging unit that takes an image; a display unit that displays the image taken by the imaging unit and displays a menu of selectable modes in accordance with a change in a position of the imaging device; an operation detecting unit that detects a position or a direction of an operation by tap applied to a surface of the imaging device; and a control unit that determines the position or the direction of the operation detected by the operation detecting unit and performs control to switch a mode in accordance with a correspondence between the position or the direction of the operation and the menu displayed on the display unit.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention are explained in detail below with reference to the accompanying drawings.

According to the embodiments of the present invention, a menu of modes is displayed on a display unit, on which shot images are displayed, and the mode is switched in accordance with the position change of an imaging device substantially around the shooting optical-axis direction and in accordance with the direction of an operation applied to the imaging device.

Figure 1:
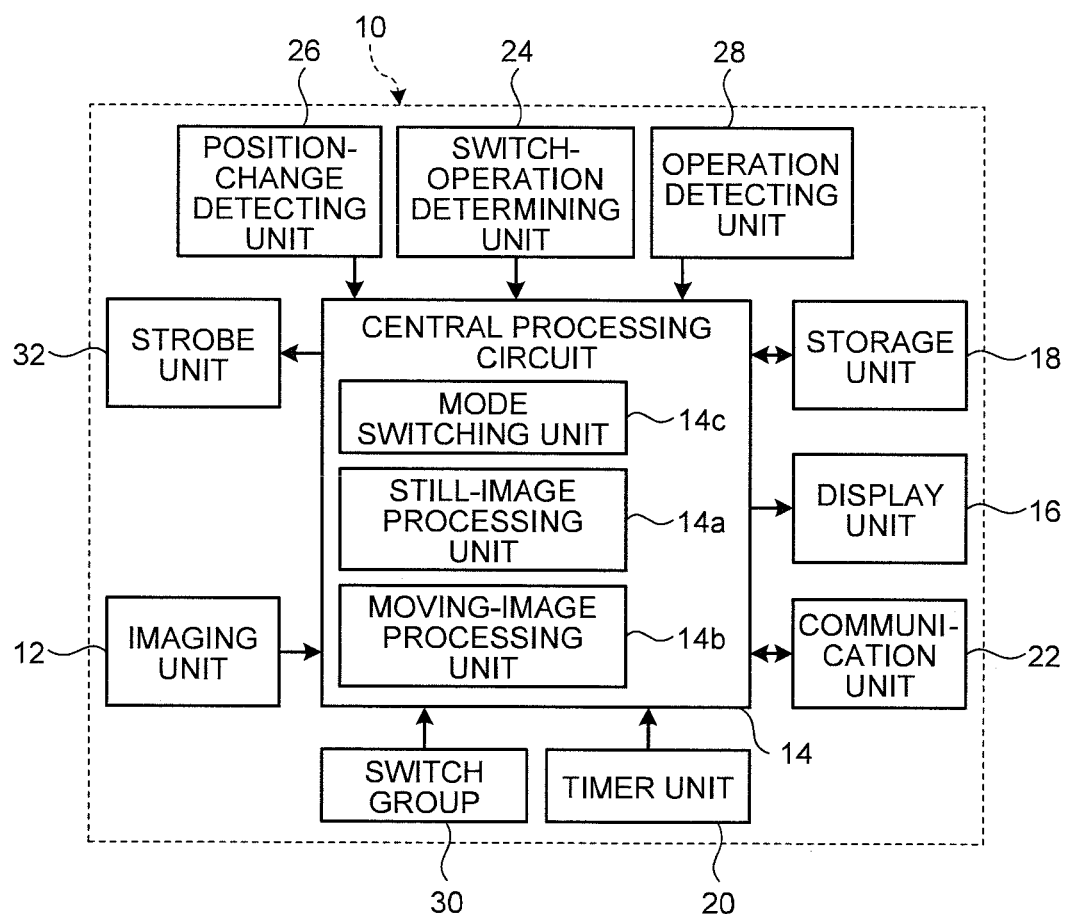
FIG. 1 is a block diagram of the main part of an imaging device embodied as a digital camera according to a first embodiment of the present invention.

FIG. 1 is a block diagram of the main part of an imaging device embodied as a digital camera according to a first embodiment of the present invention. As illustrated in FIG. 1, a digital camera (imaging device) 10 is constituted by an imaging unit 12, a control unit (central processing circuit) 14, a display unit (monitor) 16, a storage unit (memory) 18, a timer unit (clock) 20, a communication unit 22, a switch-operation determining unit 24, a position-change detecting unit 26, an operation detecting unit 28, a switch group 30, a strobe unit 32, and the like.

The imaging unit 12 includes a shooting lens 12a (see FIG. 2A) constituted by a zoom lens and an imaging element, such as a CCD or a CMOS sensor, and an image of an object is formed on the imaging element via the shooting lens and, after photoelectric conversion and digitization, is output to the central processing circuit 14. Then, it is subjected to necessary image processing, such as a correction process for color or tone or a compression process, in the central processing circuit 14, converted into an image file compressed with, for example, a JPEG format for still images or an H.264 format for moving images, or the like, and then stored in the storage unit 18 such as a flash memory.

The timer unit 20 measures the shooting date and time. Information on the shooting date and time measured by the timer unit 20 is stored in the memory 18 together with shot images. Thus, the shot images are stored in a proper order so that retrieval is facilitated. The timer unit 20 also has a stopwatch function.

Image signals from the imaging unit 12 are displayed on the display unit 16 as a live-view image (through moving image) in order to check shooting composition or timing prior to shooting. Furthermore, image signals in the memory 18 are decompressed for reproduction and displayed on the display unit 16 as well as through moving images before shooting. For example, the display unit 16 is constituted by a liquid crystal display (LCD) and is located on the back surface (the side opposite to an object; the photographer side) out of the surfaces of the digital camera 10. An organic EL display may be used as the display unit 16 instead of a liquid crystal display.

The display unit 16 may be located on the side surface of the imaging device 10 such that it can swing backward and forward. In this case, the display unit 16 swings backward and forward so that it is possible to watch the live-view image from both the back surface and the front surface (the object side).

The central processing circuit (control unit) 14, which performs image processing on shot images received from the imaging unit 12, is constituted by, for example, a CPU, a MPU, or the like, and includes a still-image processing unit 14a that processes still images, a moving-image processing unit 14b that processes moving images, and a mode switching unit 14c that determines which one of still-image processing or moving-image processing is to be performed and then switches the shooting mode. Shot images are selectively processed by the still-image processing unit 14a or the moving-image processing unit 14b and stored in the memory 18.

The communication unit 22 is constituted by a USB terminal, a wireless transmitting/receiving unit, or the like. Data on the shot images stored in the memory 18 is output to an external display unit such as a TV, a different imaging device, or the like, via the communication unit 22. Moreover, data on the shot images stored in a different imaging device is input via the communication unit 22.

The switch-operation determining unit 24 detects an operation of a power switch (a power-supply switch) that sets the shooting-possible state, an operation of a release switch 30a (see FIG. 2B), a switch operation of the photographer for selecting the shooting/reproduction mode, or the like. The detection result of the switch-operation determining unit 24 is output to the central processing circuit 14. The central processing circuit 14 performs control in accordance with the detection result of the switch-operation determining unit 24.

The position-change detecting unit 26 detects the position change, for example, inclination (an inclination angle), or the like, of the digital camera 10 around the optical axis (shooting optical-axis) direction of the shooting lens 12a. The inclination of the digital camera 10 regularly detected by the position-change detecting unit 26 is output to the central processing circuit 14 so that the position change is determined.

The operation detecting unit 28 detects an operation applied to the outer covering of the digital camera 10 by the photographer. The operation detecting unit 28 is constituted by, for example, an acceleration sensor and detects acceleration (vibration) produced on the digital camera 10 by, for example, tap. Then, the detection result is output to the central processing circuit 14. If the central processing circuit 14 determines that a predetermined operation is applied in accordance with the detection result of the operation detecting unit 28, the mode switching unit 14c switches the mode of the digital camera 10.

The "tap" described here means lightly tapping (the outer covering of the digital camera 10), and an operation of producing acceleration with a frequency of about 50 Hz corresponds to the "tap".

Because the "tap" operation produces the acceleration with a relatively high frequency from a predetermined direction, it is not performed unintentionally, and a false operation can be prevented by defining the direction of the tap to be applied and its frequency.

The switch group 30 includes the release switch 30a (see FIG. 2B), the power switch (the power-supply switch), and the like. If a switch included in the switch group 30 is operated, the switch operation is detected by the switch-operation determining unit 24, and the process that corresponds to the switch operation is set under the control of the central processing circuit 14.

The present embodiment is characterized by having a menu of selectable modes displayed on the screen of the display unit 16 and the operation detecting unit 28 detecting the acceleration (vibration) produced by, for example, tap so that the mode is switched.

The emission of the strobe unit 32 is controlled by the central processing circuit 14, the strobe auto is set as the default setting, the central processing circuit 14 determines whether the shooting is to be performed with the emission in accordance with the brightness of an object, and, if the exposure is not sufficiently obtained with natural light, the strobe unit 32 emits light. If the strobe unit 32 is forcibly caused to emit light or the strobe emission is prohibited, the strobe auto as the default setting is switched to the strobe ON or the strobe OFF.

Images taken as still images or moving images and stored in the memory 18 are subjected to a reproduction process in the central processing circuit 14. The image on which the reproduction process has been performed is displayed on the display unit 16 located on the back surface of the digital camera 10. Thus, the photographer can immediately check the result of a shooting. Furthermore, it is possible that the digital camera 10 is coupled to an external display unit such as a TV via the communication unit 22 so that the shot image is reproduced and displayed on the external display unit.

FIGS. 2A to 2C and FIGS. 3A to 3C illustrate the states in which the digital camera 10 is held horizontally and vertically and the screens of the display unit 16 in these states.

If the power switch (the power-supply switch) is turned on, the mode menu is displayed on the screen of the display unit 16 together with the live-view image. For example, three modes relating to the strobe emission, i.e., the night view, the forced emission of the strobe (STON), and the emission prohibition of the strobe (STOFF), are displayed with triangular arrows on the left side, the upper side, and the right side of the landscape-oriented screen of the display unit 16 when the digital camera 10 is held horizontally (in a horizontal position) (see FIG. 2A and FIG. 3A). The triangular arrow is a display (a tap-position instruction display) for instructing the position to be tapped, and the tap is performed in the direction of the arrow so that the mode is switched to a corresponding mode.

The mode menu displayed on the display unit 16, its display position, and the like, are controlled by the central processing circuit 14, and a plurality of modes is displayed in combination. The illustrated mode menu is only an example. Furthermore, the display positions of the modes on the screen of the display unit 16 are not limited to three positions that are located 90 degrees apart from one another on the left side, the upper side, and the right side. For example, the modes may be displayed at five positions that are located 45 degrees apart from one another on (1) the left side, (2) midway of the left side and the upper side, (3) the upper side, (4) midway of the upper side and the right side, and (5) the right side of the screen of the display unit 16. Moreover, the mode may be displayed on the lower side of the screen of the display unit 16.

For example, the mode menu is displayed independently of the inclination of the digital camera 10 around the optical axis (shooting optical-axis) direction of the shooting lens 12a. Specifically, even if it is inclined from the horizontal position at 90 degrees in a clockwise direction as viewed from the side of the photographer as illustrated in FIG. 2B or inclined at 90 degrees in a counterclockwise direction as illustrated in FIG. 2C, the night-view mode, the forced-emission (STON) mode, and the emission-prohibition (STOFF) mode are displayed on the left side, the upper side, and the right side of the display unit 16, respectively (see FIG. 3B and FIG. 3C).

The position change, for example, the inclination (the inclination angle), of the digital camera 10 is detected by the position-change detecting unit 26. Furthermore, the acceleration (vibration) produced on the digital camera 10 is detected by the operation detecting unit 28. Then, each detection result is output to the central processing circuit 14, and mode switching is performed under the control of the central processing circuit 14 in accordance with the relation between the position change (for example, the inclination) of the digital camera 10 and the tap direction.

If any one of the six surfaces, i.e., the upper, lower, right, left, front, and back surfaces, of the digital camera 10, for example, an upper surface 10U where the release switch 30a is located is the operation surface (tap surface) and if tap is applied to the operation surface 10U, mode switching is performed. For example, in the case of the digital camera 10 that is located in the horizontal position, if tap is applied from the upper side to the lower side so that downward (the direction of the arrow T) acceleration (vibration) is produced on the digital camera 10, as indicated by the arrow T in FIG. 3A, the central processing circuit 14 performs mode switching to switch to the mode displayed on the screen position of the display unit 16 that corresponds to the tapped upper surface (operation surface) 10U.

Specifically, the mode is switched from the strobe auto as the default setting to the STON mode (the forced-emission mode) displayed on the upper side that is the screen position of the display unit that corresponds to the upper surface 10U that is the operation surface of the digital camera. In other words, the mode is switched to the STON mode associated with the triangular arrow in a downward direction that is the same as the direction of the tap applied to the operation surface (the upper surface 10U).

Figure 3A:
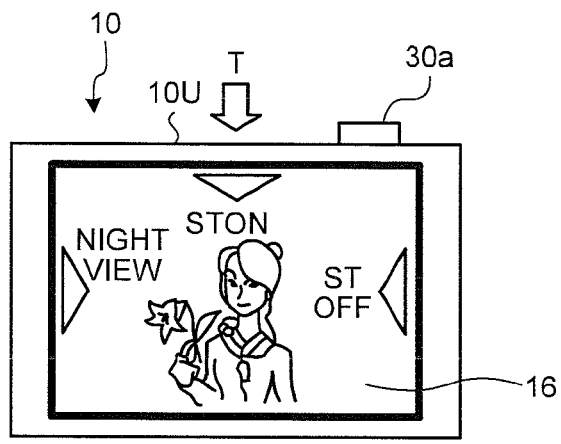
FIGS. 3A to 3C illustrate the screens of a liquid crystal display when the digital camera is held horizontally and vertically.
Figure 3B:
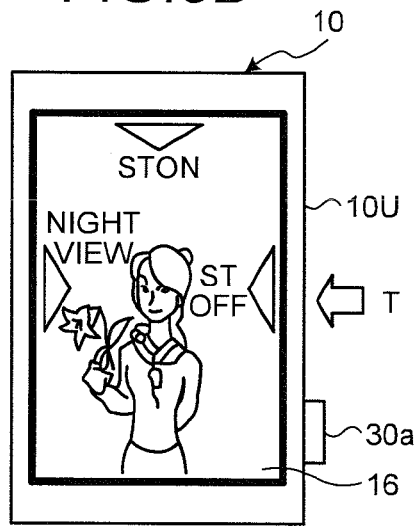

If the tap is applied to the digital camera 10, which is located in the vertical position (the longitudinal position) such that the upper surface 10U with the release switch 30a arranged thereon is positioned on the right side as viewed from the photographer, from the right side to the left side as indicated by the arrow T in FIG. 3B so that acceleration to the left (the direction of the arrow T) is produced on the digital camera 10, the mode is switched from the strobe auto as the default setting to the STOFF mode (the emission-prohibition mode) displayed on the screen position (the right side) of the display unit 16 that corresponds to the upper surface 10U.

Figure 3C:
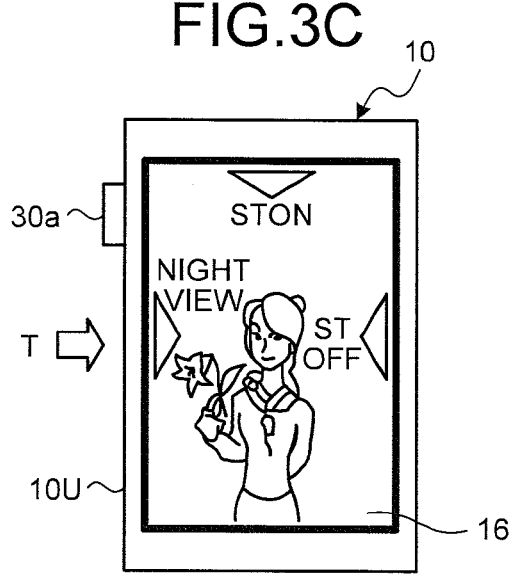

If the tap is applied to the digital camera 10, which is located in the vertical position (the longitudinal position) such that the upper surface 10U with the release switch 30a arranged thereon is positioned on the left side as viewed from the photographer, from the left side to the right side as indicated by the arrow T in FIG. 3C so that acceleration to the right (the direction of the arrow T) is produced on the digital camera 10, the mode is switched to the night-view mode displayed on the screen position (the left side) of the display unit 16 that corresponds to the upper surface 10U.

The switched mode is stored under the control of the central processing circuit 14, and the shooting can be performed with the switched mode independently of the position during mode switching. Specifically, if mode switching is performed in the vertical position (the longitudinal position) as illustrated in FIG. 3B or FIG. 3C, the shooting may be performed in the vertical position without change or the vertical position returns to the horizontal position so that the shooting may be performed in the horizontal position. If the vertical position returns to the horizontal position, the shooting can be performed in the usual shooting position (the horizontal position) of the landscape-oriented display unit 16.

Thus, according to the present embodiment, mode switching is performed by tap to switch to the mode in the display position of the display unit 16 that corresponds to the position change of the digital camera 10. The digital camera 10 can be tapped with the index finger, or the like, while being held, whereby mode switching can be performed by one-handed operation. Furthermore, the mode menu is displayed on the display unit 16 so that a number of switchable modes are displayed, and it is possible to easily change the mode in a position that can be tapped with the index finger, whereby switching to the desired mode can be quickly performed.

Figure 2A:
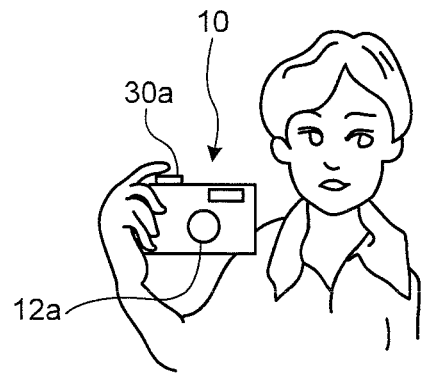
FIGS. 2A to 2C illustrate the states in which the digital camera is held horizontally and vertically.
Figure 2B:
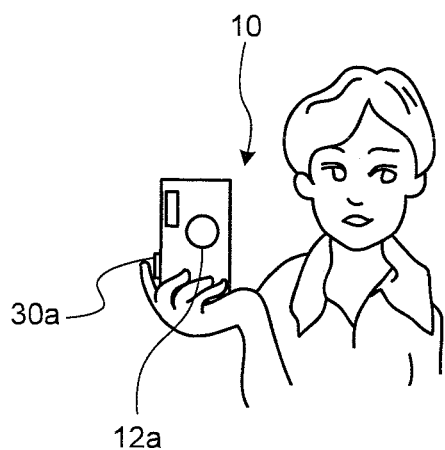
Figure 2C:
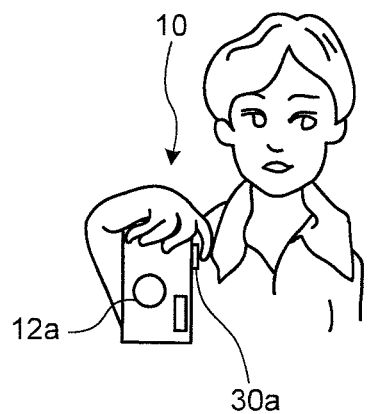

According to the present embodiment, as illustrated in FIG. 2A, and the like, the release switch 30a is located on the upper surface 10U of the digital camera 10. However, in the case of a digital camera, a digital video camera, or the like, that is elongated in the shooting optical-axis direction, there is an example of an arrangement in which a swing member with a liquid crystal display is located on the side surface and a release switch is mounted on the swing member on the side of the liquid crystal display; therefore, the position of the release switch is not limited to the upper surface.

However, as in the embodiment, with a configuration in which the mode is switched to a corresponding mode if the tap to the upper surface 10U is detected by the operation detecting unit 28 using the upper surface 10U where the release switch 30a is arranged as the operation surface, the index finger for tapping the upper surface 10U does not contribute to holding of the digital camera 10 and is free compared to the other fingers; therefore, the tap can be performed without decreasing the holding stability. Moreover, the index finger is a finger for operating the release switch 30a so that the tap and the operation of the release switch 30a can be performed with the same finger under a sequence of operations and the shooting can be performed immediately after mode switching is performed by tap, whereby the shooting can be performed in an appropriate mode without losing a photo opportunity.

Figure 4A:
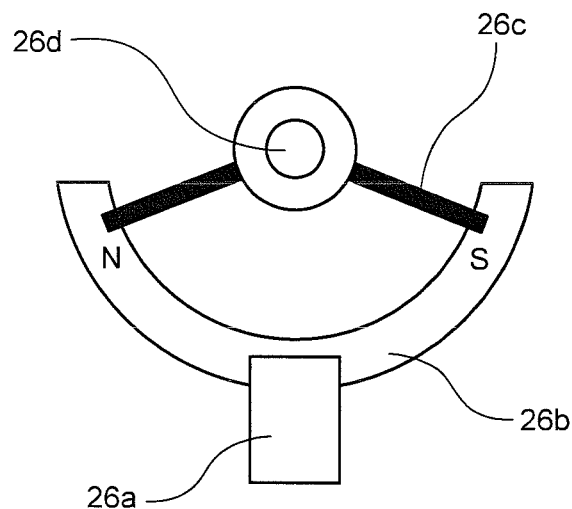
FIGS. 4A and 4B illustrate an example of detection of position change by using a position-change detecting unit.
Figure 4B:
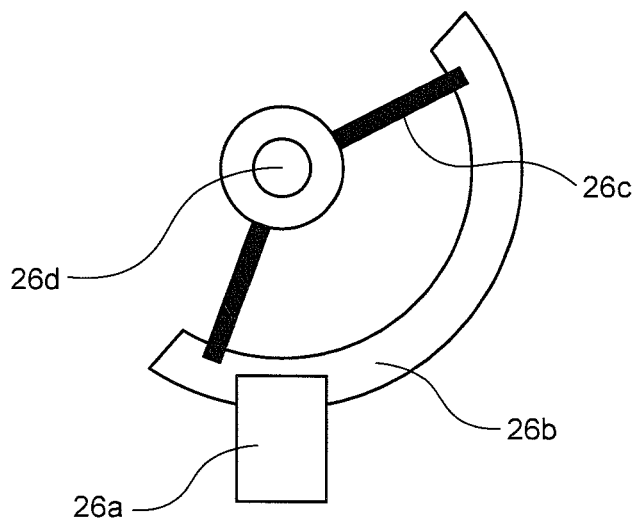

FIGS. 4A and 4B illustrate an example of a method for detecting position change by using the position-change detecting unit 26. The position-change detecting unit 26 includes a combination of a hall element 26a and a magnet 26b constituted by a permanent magnet, whereby the hall element detects the magnetic-field change of the magnet corresponding to the position change (inclination) of the digital camera 10.

The position-change detecting unit 26 is rotatably supported by a shaft 26d on which supporting arm members 26c are horizontally arranged in an inverted V shape, the partially-circular magnet 26b is supported by the ends of the supporting arm members 26c, and the hall element 26a is located at a position where it is overlapped with part of the magnet 26b.

If the digital camera 10 is held horizontally, the magnet 26b rotates around the horizontal shaft 26d and hangs down due to its weight so that, as illustrated in FIG. 4A, the middle of the magnet 26b is aligned with the hall element 26a because of the balance on the right and the left sides.

If the digital camera 10 is inclined substantially around the shooting optical-axis direction as illustrated in FIG. 4B, the magnet 26b rotates so that the magnetic field is changed, and the hall element 26a detects this change. Then, a detection signal of the hall element 26a is output to the central processing circuit 14 and the position change (inclination) of the digital camera 10 is determined.

The above-described position-change detecting unit obtained by combining the hall element 26a and the magnet 26b is an example, and a gyroscope or a mercury switch for detecting camera shake may be the position-change detecting unit.

Moreover, it may be determined whether the position of the digital camera 10 is changed in accordance with the change of an image in the imaging element and, in this case, the imaging element functions as the position-change detecting unit. Furthermore, an acceleration sensor or an angular acceleration sensor may be the position-change detecting unit.

Figure 5A:
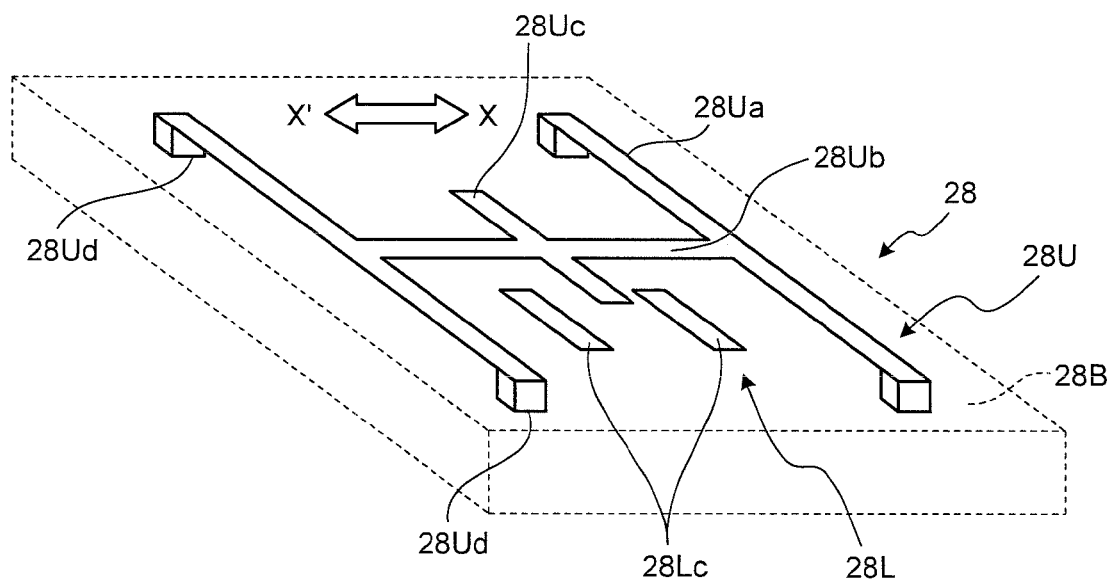
FIGS. 5A to 5D illustrate an example of detection of an operation direction by using an operation detecting unit.

FIGS. 5A to 5D illustrate an example of the detection of the operation direction by using the operation detecting unit 28. As illustrated in FIG. 5A, for example, the operation detecting unit 28 includes a combination of a movable upper electrode 28U and a fixed lower electrode 28L that are contained in a thin six-sided casing 28B and is configured as an acceleration sensor that detects the occurrence of acceleration (vibration) in accordance with a change in the position of the movable upper electrode 28U with respect to the fixed lower electrode 28L.

For example, the upper electrode 28U is integrally formed by having a pair of lateral electrodes 28Ua that are parallel to each other, with each end placed on a base 28Ud so that they lift up, a connection electrode 28Ub that connects the middle sections of the pair of lateral electrodes, and an intermediate electrode 28Uc that extends from the middle of the connection piece in parallel to the lateral electrodes. Moreover, the lower electrode 28L is constituted by a pair of base electrodes 28Lc that are formed by being pressed from the same metallic thin plate as the upper electrode 28U, and the pair of base electrodes are located apart from each other at an equal distance on the right and left sides from the projection position of the intermediate electrode under the intermediate electrode 28Uc of the upper electrode and are opposed to each other in parallel to the intermediate electrode 28Uc.

In the operation detecting unit (acceleration sensor) 28 with such a configuration, if the acceleration is applied in the direction parallel to the connection electrode 28Ub of the upper electrode 28U, the upper electrode 28U is shifted and vibrated in the direction of the acceleration in the plane where it is located, whereby the relative position of the intermediate electrode 28Uc with respect to the fixed lower electrode 28L is changed. Then, because the output waveforms from the upper and the lower electrodes are changed in accordance with the change (vibration) of the relative position, the direction of the acceleration can be detected from the output waveforms.

Figure 5B:
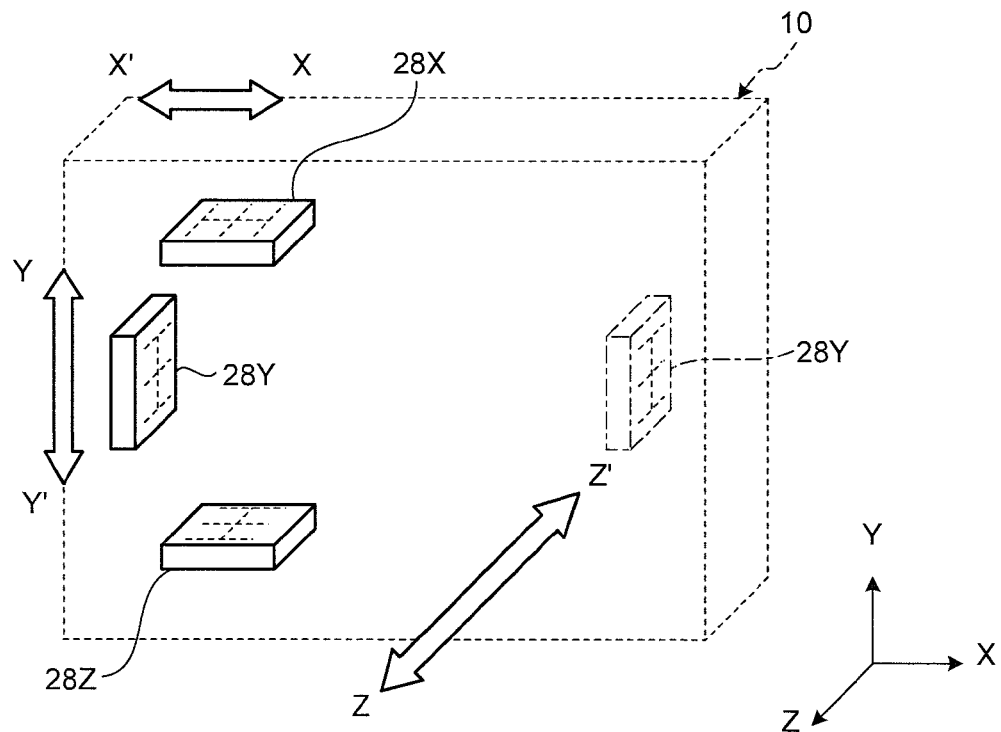

As illustrated in FIG. 5B, the digital camera 10 is configured such that it includes three acceleration sensors so as to detect the acceleration in the three dimensions of X, Y, and Z, wherein the X axis extends in the horizontal direction perpendicular to the optical axis (shooting optical axis) of the shooting lens 12a, the Y axis in the vertical direction perpendicular to the shooting optical axis, and the Z axis in the horizontal direction parallel to the shooting optical axis. Then, an acceleration sensor 28X that detects the acceleration in the X axial direction is arranged such that the connection electrode 28Ub is parallel to the X axis, an acceleration sensor 28Y that detects the acceleration in the Y axial direction is arranged such that the connection electrode is parallel to the Y axis, and an acceleration sensor 28Z that detects the acceleration in the Z axial direction is arranged such that the connection electrode is parallel to the Z axis.

Figure 5C:
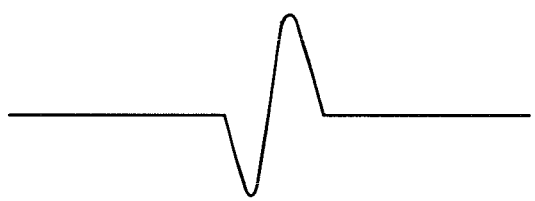
Figure 5D:
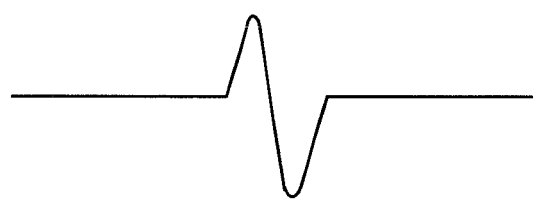

If it is assumed that the acceleration sensor illustrated in FIG. 5A is the acceleration sensor 28X in the X axial direction and tap is applied to the digital camera 10 in the direction X of the arrow, the acceleration sensor 28X in the X axial direction detects it. For example, the waveform of the acceleration (vibration) in the X axial direction is output as illustrated in FIG. 5C, and the direction of the initially generated waveform corresponds to the direction to which the tap is applied. Furthermore, if tap is applied in the opposite direction X' of the arrow, the waveform of the acceleration (vibration), which is inverted with respect to the waveform in FIG. 5C, is output (see FIG. 5D).

Thus, if the acceleration sensor 28X that detects the acceleration and outputs the waveform and the direction of the initially generated waveform out of the main waveform of the acceleration sensor are detected, it is determined, from the detection result, whether the tap is applied from the plus X (+X) direction in the X axis or from the minus X (−X) direction.

In the same manner, the direction (Y (+Y), Y' (−Y), Z (+Z), or Z' (−Z)) of the tap applied in the Y axis and the Z axis are determined from the acceleration sensor that outputs the waveform and the output waveform (the direction of the initially generated waveform). The arrangement of the three acceleration sensors 28X, 28Y, and 28Z makes it possible to determine the direction of the tap in the six directions (+X, −X; +Y, −Y; +Z, −Z) that are obtained by three combinations of two opposite directions. Usually, because the outer shape of the digital camera 10 is substantially a hexahedron, the arrangement of the three acceleration sensors 28X, 28Y, and 28Z makes it possible to definitely determine the tap applied to the six surfaces (the upper and lower surfaces, the right and left surfaces, and the front and back surfaces) of the digital camera 10.

For example, in FIGS. 3A to 3C, the tap on the surface (the upper surface 10U) where the release switch 30a is positioned is considered, and the tap applied to the upper surface 10U is detected by the acceleration sensor 28Y as the acceleration in the Y' (−Y) direction and determined by the central processing circuit 14.

It is possible that gravitation acceleration is detected by the acceleration sensor to determine the position of the digital camera 10 and, if switching is controlled corresponding to only a simple position such that the side surface is faced downward, the position-change detecting unit 26 illustrated in FIG. 4 can be omitted.

Although the position or the surface of the outer covering of the digital camera 10 to which an operation is applied is detected in accordance with a detection result of the acceleration sensor, other methods can be used to detect the position or the surface of the outer covering of the digital camera 10 to which the operation is applied. For example, it is possible to detect pressure applied to the outer covering of the digital camera 10 by arranging a pressure-sensitive sensor. Furthermore, a switch for a switching operation may be arranged on the outer covering of the digital camera 10. Thus, an operation input for switching the display of the mode menu of the digital camera 10 or switching the mode can be performed by various methods.

Figure 6:
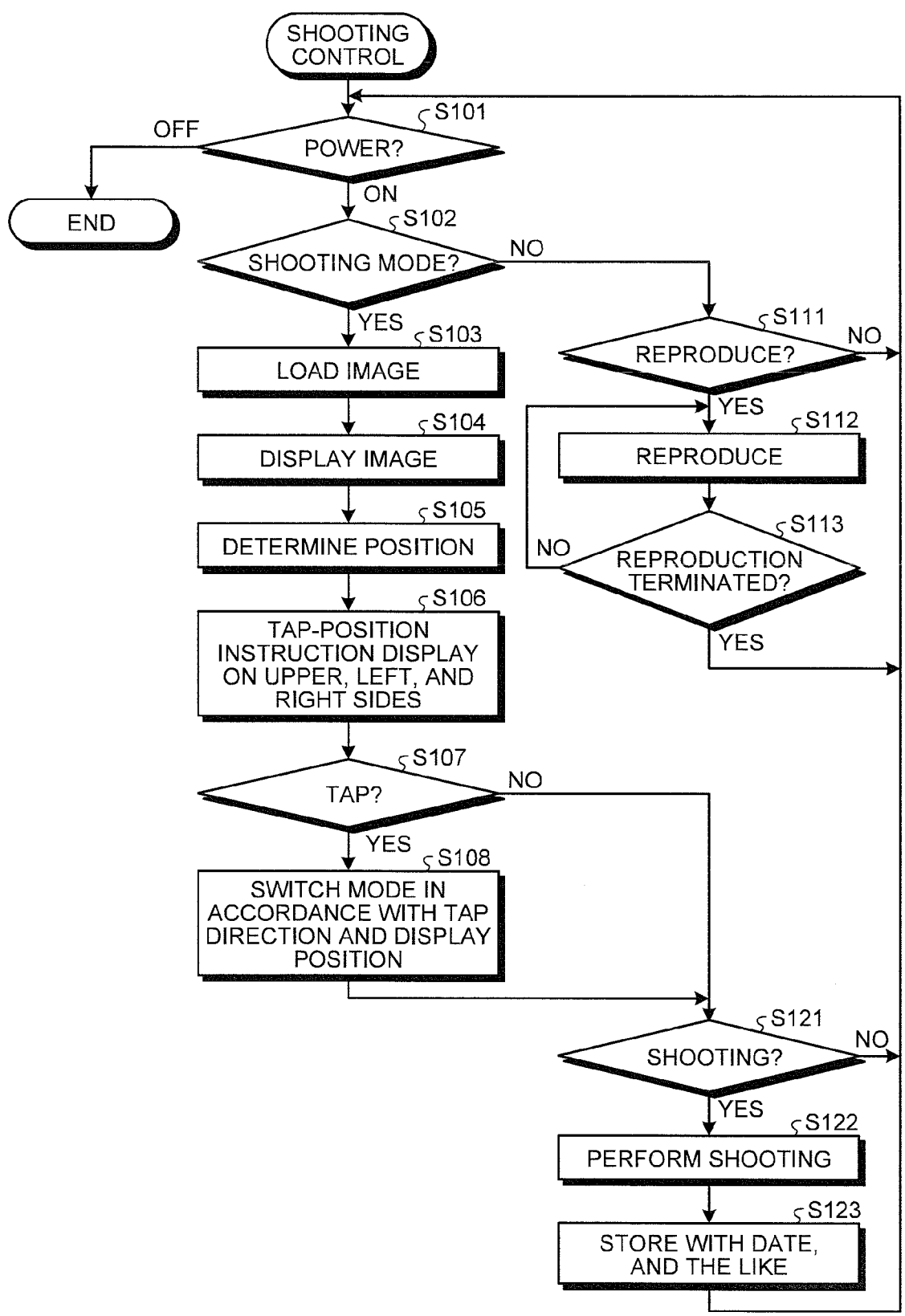
FIG. 6 is a flowchart of shooting control by the digital camera according to the present embodiment.

FIG. 6 is a flowchart of the shooting control by the digital camera 10 according to the present embodiment. First, the operating state of the power switch (the power-supply switch) is determined at Step S101 and, if the power switch is not operated and turned off (Step S101: OFF), the shooting control is terminated. Conversely, if the power switch is turned on (Step S101: ON), the process proceeds to Step S102 to determine whether the shooting mode is set. If the shooting mode is not set as a result of determination at Step S102 (Step S102: No), the process proceeds to Step S111.

It is determined whether the reproduction mode is set at Step S111. If the reproduction mode is not set as a result of determination (Step S111: No), the process returns to Step S101. Conversely, if the reproduction mode is set (Step S111: Yes), the shot image stored in the storage unit 18 is selected and displayed (reproduced) on the display unit 16 at Step S112. When it is reproduced, it is determined whether the reproduction is to be terminated at Step S113. If a different image is to be reproduced as a result of determination (Step S113: No), the process returns to Step S112 to repeat the reproduction. On the other hand, if the reproduction is to be terminated as a result of determination (Step S113: Yes), the process returns to Step S101.

If the shooting mode is set at Step S102 (Step S102: Yes), an image of an object is loaded into the imaging unit 12 at Step S103, and a live-view image (through moving image) is displayed on the display unit 16 at Step S104. If the shooting mode is set, the inclination (position change) of the digital camera 10 substantially around the shooting optical-axis direction is regularly detected by the position-change detecting unit 26 and a detection result is output to the central processing circuit 14 to determine the position of the digital camera 10 (Step S105). Furthermore, the modes to be switched are displayed on predetermined positions of the screen of the display unit 16 together with the triangular arrows (tap-position instruction display) independently of the position change (inclination) of the digital camera 10 at Step S106. For example, as illustrated in FIG. 3A, the three modes of the night view, the forced emission (STON), and the emission prohibition (STOFF) are displayed on the left side, the upper side, and the right side, respectively, of the landscape-oriented screen of the display unit 16.

Because it is inconvenient if moving images suddenly become still images due to vibration, or the like, during shooting of the moving images, the detection of the position change (inclination) does not need to be performed during the shooting of moving images. Furthermore, the detection of the position change does not need to be performed during continuous shooting, or the like, even during the shooting of still images, in order to save energy and prevent a false operation.

Then, the direction from which the tap is applied to the digital camera 10 is determined at Step S107. The acceleration (vibration) produced on the digital camera 10 is detected by the operation detecting unit 28, and a detection result is output to the central processing circuit 14, whereby the tap direction is determined by the central processing circuit 14. If the central processing circuit 14 determines that the tap is applied from a predetermined direction (Step S107: Yes), the central processing circuit 14 performs mode switching of the digital camera 10 in accordance with the tap direction and the display position of the mode menu on the display unit 16 (Step S108).

It is determined whether it is the shooting in the switched mode at Step S121 and, if it is determined as the shooting (Step S5121: Yes), the release switch 30a is operated to perform the shooting at Step S122. Afterward, the shot image is stored in the storage unit 18 together with information on the date and time (Step S123). If it is not determined as the shooting at Step S121 (Step S121: No), the process returns to Step S101.

If it is not determined that the tap is applied from a predetermined direction at Step S107 (Step S107: No), mode switching is not performed and the process proceeds to Step S121.

An explanation will be given below of an imaging device according to a second embodiment of the present invention embodied as a digital camera in the same manner as the above-described first embodiment. The same reference numerals are assigned to corresponding components in the second embodiment that have the same functions as the components in the above-described first embodiment, their explanations are omitted, and an explanation will be mainly given of a configuration different from the first embodiment.

According to the second embodiment, the configuration is such that the digital camera 10 is shaken so that the display positions of the modes on the screen of the display unit 16 are varied like roulette.

Figure 7A:
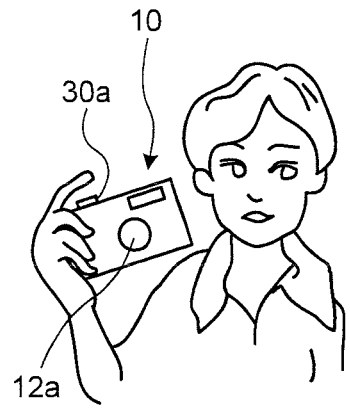
FIGS. 7A to 7C illustrate the states where the digital camera is held horizontally and the digital camera is shaken fast from the horizontal position in a counterclockwise direction and a clockwise direction substantially around the shooting optical-axis direction according to a second embodiment of the present invention.
Figure 7B:
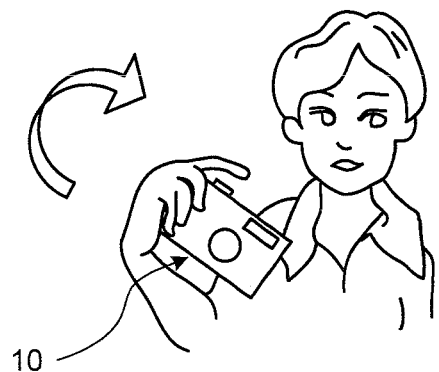
Figure 7C:
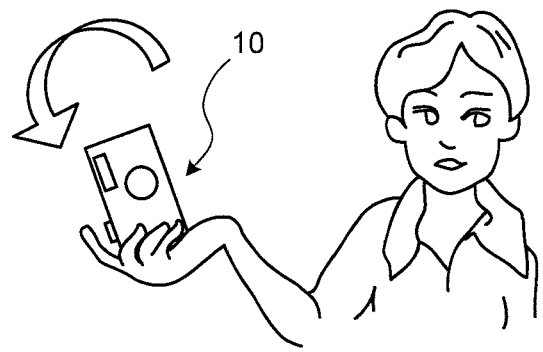
Figure 8A:
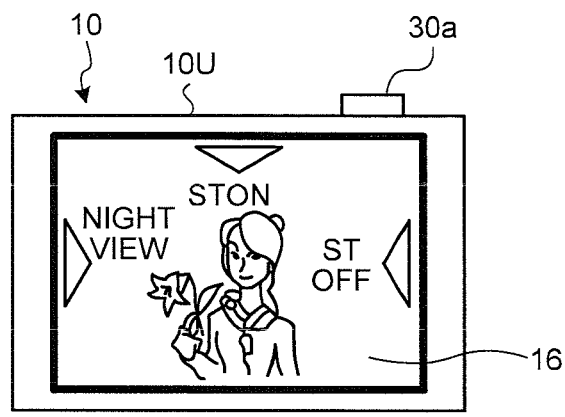
FIGS. 8A to 8C illustrate the screens of the liquid crystal display in the states where the digital camera is held horizontally and the digital camera is shaken fast from the horizontal position in a counterclockwise direction and a clockwise direction substantially around the shooting optical-axis direction according to the second embodiment.
Figure 8B:
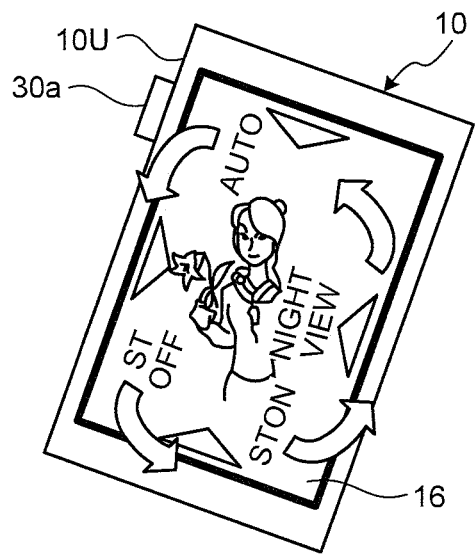
Figure 8C:
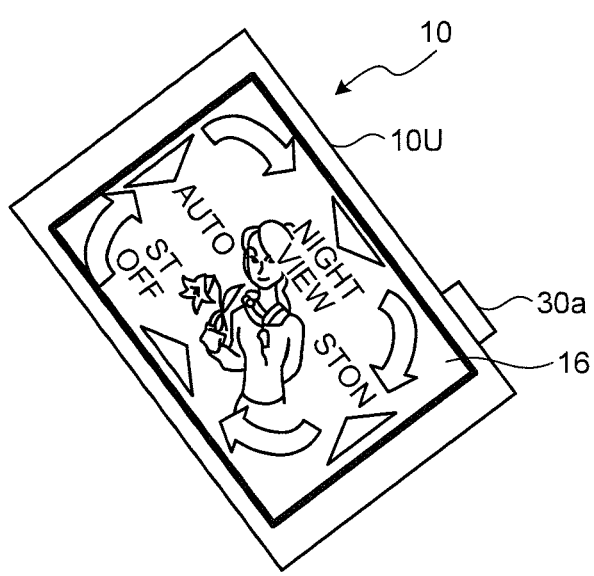

FIG. 7A to FIG. 7C illustrate the states where the digital camera 10 is held horizontally and the digital camera 10 is shaken fast from the horizontal position in a counterclockwise direction and a clockwise direction substantially around the shooting optical-axis direction. FIG. 8A to FIG. 8C illustrate the screens of the display unit 16 that correspond to FIG. 7A to FIG. 7C, respectively.

The "shake" described here means shaking the digital camera 10 fast substantially around the shooting optical-axis direction, and the "shake" corresponds to an operation for producing acceleration (vibration) with a frequency of about 5 Hz. While the frequency of acceleration produced by tap is about 50 Hz, the frequency of acceleration produced by shake is one order of magnitude smaller than that; therefore, if the generated frequency is detected, the central processing circuit 14 can easily determine whether (distinguish between) the applied operation is tap or a shake. Furthermore, because the magnitudes (amplitudes) of accelerations produced by tap and shake are approximately one order of magnitude different from each other (obviously, that of the acceleration by shake is larger), it is possible to determine (distinguish between) tap or shake in accordance with the magnitude of acceleration.

For example, according to the second embodiment, in the same manner as the first embodiment, the three modes of the night view, the forced emission of the strobe (STON), and the emission prohibition (STOFF) are displayed with the triangular arrows on the left side, the upper side, and the right side, respectively, of the landscape-oriented screen of the display unit 16 when the digital camera 10 is held horizontally (in the horizontal position) (see FIG. 7A and FIG. 8A).

If the digital camera 10 is shaken (shaken fast) in a counterclockwise direction (as viewed from the photographer) substantially around the shooting optical-axis direction from a state where it is held horizontally, as illustrated in FIG. 7B, the position-change detecting unit 26 detects the position change (inclination). A detection result is output to the central processing circuit 14. The central processing circuit 14 displays the mode display (mode menu) on the display unit 16 by sequentially moving them in the shake direction (in the counterclockwise direction) as indicted by the arrow (see FIG. 8B).

Specifically, the night-view mode, which is displayed on the left side of the display unit 16 when the digital camera 10 is located in the horizontal position, is shifted by one (moved by 90 degrees) in the shake direction (the counterclockwise direction) so that it is displayed on the lower side of the liquid crystal display. Furthermore, the forced-emission (STON) mode, which is displayed on the upper side of the display unit 16, is moved to the left side of the display unit 16 and displayed, and the emission-prohibition (STOFF) mode, which is displayed on the right side of the display unit 16, is moved to the upper side of the display unit 16 and displayed. Then, a new mode, for example, the strobe-auto (AUTO) mode is displayed on the right side of the display unit 16 where the emission-prohibition (STOFF) mode is displayed.

Contrary to FIG. 7B, if the digital camera 10 is shaken in a clockwise direction (as viewed from the photographer) substantially around the shooting optical-axis direction from the state where it is held horizontally (see FIG. 7C), the night-view mode, which is displayed on the left side of the display unit 16, is moved to the upper side of the display unit 16 and displayed, the forced-emission (STON) mode on the upper side is moved to the right side of the display unit 16 and displayed, and the emission-prohibition (STOFF) mode, which is displayed on the right side, is moved to the lower side of the display unit 16 and displayed. Then, the strobe-auto (AUTO) mode is newly displayed on the left side of the display unit 16 where the night-view mode is displayed.

If the digital camera 10 is shaken in a counterclockwise direction so that the modes on the liquid crystal display are switched in the counterclockwise direction as illustrated in FIG. 8B, the digital camera 10 returns to the horizontal position, and then the digital camera 10 is further shaken in the counterclockwise direction, the modes on the screen of the display unit 16 are displayed by being further shifted (moved) one by one in the counterclockwise direction. In the same manner, if the digital camera 10 is shaken in a clockwise direction so that the modes on the display unit 16 are switched in the clockwise direction as illustrated in FIG. 8C, the digital camera 10 returns to the horizontal position, and then the digital camera 10 is further shaken in the clockwise direction, the modes on the screen of the display unit 16 are displayed by being further shifted one by one.

Thus, if the digital camera 10 is shaken in a counterclockwise direction, the modes on the screen of the display unit 16 are displayed by being shifted in the counterclockwise direction while, if the digital camera 10 is shaken in a clockwise direction, the modes on the screen of the display unit 16 are displayed by being shifted in the clockwise direction. That is, the modes are sequentially moved and displayed like roulette on the display unit 16 under the control of the central processing circuit 14.

After the digital camera 10 is shaken to change the display of the modes, the digital camera 10 returns to the horizontal position, and then, for example, the upper surface 10U of the digital camera 10 where the release switch 30a is located is tapped, whereby the acceleration produced by the tap is detected by the operation detecting unit 28. Then, if it is determined that the direction to which the tap is applied is a predetermined direction, mode switching is performed. Afterwards, if the release switch 30a is operated, the shooting is performed in the switched mode.

The shift (movement) of the mode by shake is not limited to one, and a configuration may be such that the mode is displayed by being shifted (moved) two by two or three by three in a clockwise direction or a counterclockwise direction depending on the force of the shake.

According to the second embodiment, it is possible that the position of the digital camera 10 is changed (inclined) by shake to switch the mode display and switching to a corresponding mode is performed by tap. Because both shake and tap can be performed while the digital camera 10 is held, mode switching can be performed by one-handed operation and the shooting can be performed in the desired mode.

Although the configuration is such that mode switching is performed if the operation detecting unit 28 detects tap applied to the upper surface 10U where the release switch 30a is located, the surface on which the tap is detected is not limited to the upper surface 10U of the digital camera 10. However, if the configuration is such that, when the operation detecting unit 28 detects tap applied to the upper surface 10U where the release switch 30a is located, the mode is switched to the mode displayed on the screen of the display unit 16 that corresponds to the upper surface 10U, the tap can be performed without decreasing the holding stability. Furthermore, because the index finger is a finger for operating the release switch 30a, the shooting can be performed immediately after mode switching is performed by tap subsequent to shake, whereby the shooting can be performed without losing a photo opportunity.

Instead of displaying the mode menu of four modes at four positions on the screen of the display unit 16 by sequentially moving them like roulette, a different mode may be added to the mode menu and displayed during the subsequent shake as a substitute for the display of a mode when the mode reaches a specific position among the four positions on the screen of the display unit 16.

For example, as illustrated in FIG. 7B, if the digital camera 10 is shaken in a counterclockwise direction to display the night-view mode on the lower side of the screen of the display unit 16 and then further shaken in the counterclockwise direction, a different mode, for example, a party-shot mode (the mode in which strobe light reaches a long distance) may be newly displayed on the right side of the screen of the display unit 16 instead of the night-view mode.

As described above, instead of the roulette display in which the modes displayed on the display unit 16 are fixed, if the roulette display is such that the displayed modes are not fixed and a different mode is alternatively displayed at a specific position, various modes can be sequentially displayed and mode switching can be performed over a wide range.

Figure 9:
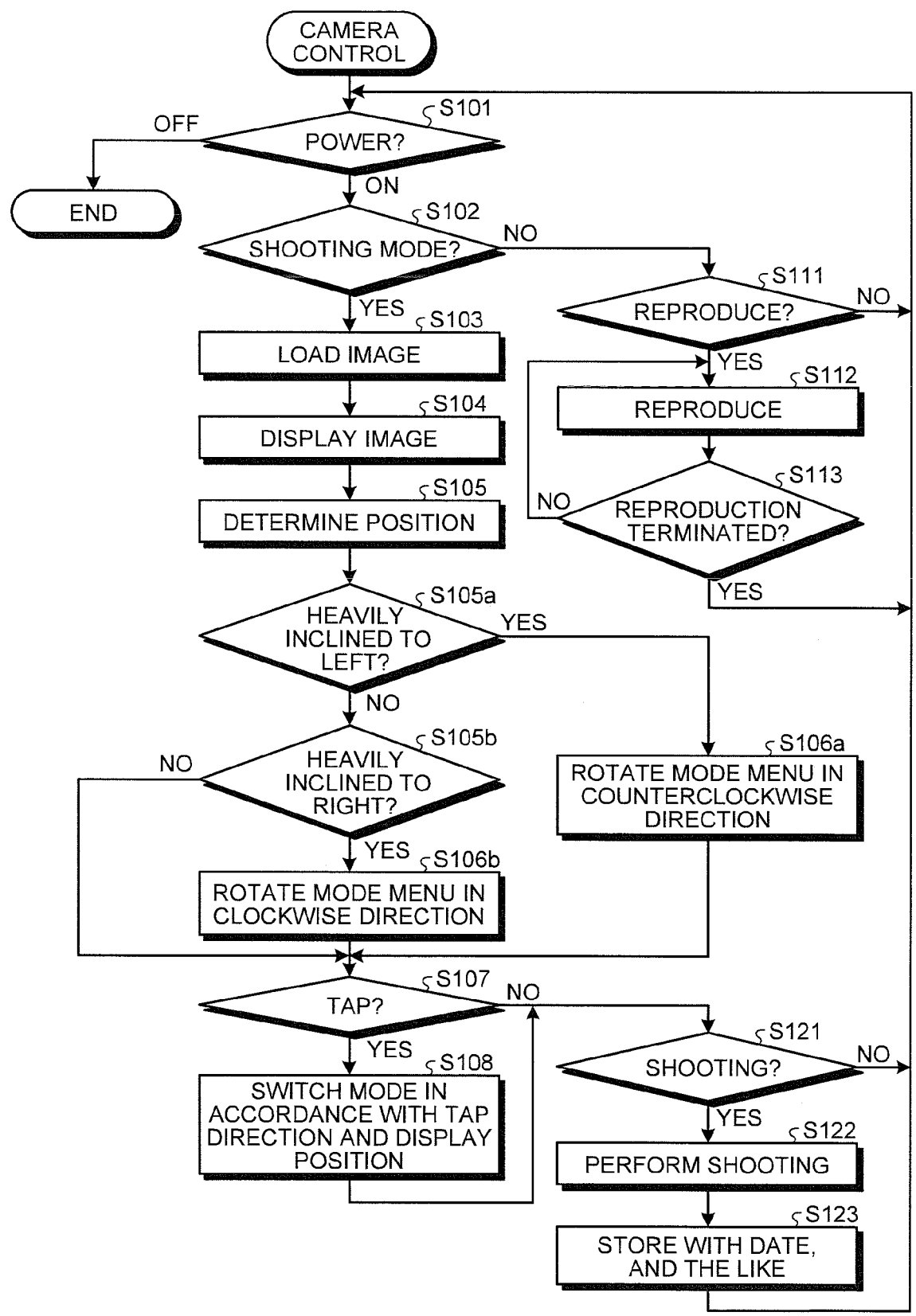
FIG. 9 is a flowchart of shooting control according to the second embodiment of the present invention.

FIG. 9 is a flowchart of shooting control according to the second embodiment. Because Steps S101 to S105 from turning-on of the power switch to determination of the position and Steps S111 to S113 related to the reproduction mode are the same as the first embodiment, their explanations will be omitted.

In the shooting mode, the position change (inclination) of the digital camera 10 substantially around the shooting optical-axis direction is regularly detected by the position-change detecting unit 26, and the detection result is output to the central processing circuit 14 to determine the position of the digital camera (Step S105). Then, it is determined whether the digital camera 10 is heavily inclined to the left (as viewed from the photographer) substantially around the optical-axis direction from the state where it is held horizontally at Step S105a. Specifically, the position-change detecting unit 26 detects whether the digital camera 10 is shaken (shaken fast) in a counterclockwise direction, and the detection result is output to the central processing circuit 14 for determination. If the central processing circuit 14 determines that the digital camera 10 is shaken in the counterclockwise direction (Step S105a: Yes), the central processing circuit 14 rotates (moves) the mode menu displayed on the screen of the display unit 16 in the shake direction (the counterclockwise direction) at Step S106a so as to display the modes by shifting the display positions one by one (see FIG. 8B).

If it is not determined that the digital camera 10 is heavily shaken to the left (shaken in the counterclockwise direction) at Step S105a (Step S105a: No), it is determined whether it is heavily shaken in the opposite direction, i.e., to the right (shaken in the clockwise direction) at Step S105b. If it is determined that the digital camera 10 is heavily shaken to the right (Step S105b: Yes), the central processing circuit 14 rotates the mode menu displayed on the screen of the display unit 16 in the shake direction (in the clockwise direction) at Step S106b so as to display the modes by shifting the display positions one by one (see FIG. 8C).

Thus, if an operation is performed with the shooting optical-axis direction changed as little as possible, the digital camera 10 does not lose sight of an object. Therefore, if the live-view image is displayed, the shooting can be performed without losing a photo opportunity.

When the mode menu is rotated (moved) in accordance with the shake direction at Steps S106a and S106b, the direction from which the tap is applied to the digital camera 10 is determined at Step S107. Furthermore, if it is not determined that it is heavily inclined to the right, i.e., the shake is not performed in any directions at Step S105b (Step S105b: No), the direction from which the tap is applied to the digital camera 10 is determined at Step S107.

Although detailed explanations are not given of Steps S107 to S123 from determination of the presence or absence of tap to shooting and storing because they are the same as those in the first embodiment, a brief overview is given as follows. If it is determined that tap is applied from a predetermined direction at Step S107 (Step S107: Yes), the central processing circuit 14 performs mode switching (Step S108). Afterwards, the shooting in the switched mode is determined, and the shooting is performed so that it is stored in the storage unit 18 together with date and time information (Steps S121 to S123). Conversely, if tap is not applied from a predetermined direction (Step S107: No), mode switching is not performed and the process proceeds to Step S121.

The position change of the digital camera 10 is detected by the position-change detecting unit 26 and the change in the output is detected so as to determine shake. However, for example, as illustrated in FIG. 5B, if the acceleration sensors 28Y that detect the acceleration in the Y axial direction are arranged on the right and left side portions of the digital camera 10, it can be determined that the acceleration is produced by shake in accordance with the magnitude of the waveform (the magnitude of the amplitude) of the acceleration produced by the shake and, furthermore, it can be determined whether the shake direction is in a clockwise direction or a counterclockwise direction in accordance with the direction of the initially generated waveform. Specifically, if the operation detecting unit 28 is the acceleration sensor and the acceleration sensors 28Y that detect the acceleration in the Y axial direction are arranged on the right and left side portions, the operation detecting unit 28 also functions as the position-change detecting unit 26; therefore, the position-change detecting unit 26 can be omitted.

An explanation will be given below of an imaging device according to a third embodiment of the present invention embodied as a digital camera in the same manner as the above-described first and second embodiments. In the third embodiment, the same reference numerals are assigned to the corresponding components in the third embodiment that have the same functions as the components in the above-described first embodiment, their explanations are omitted, and an explanation will be mainly given of a configuration different from the first and second embodiments.

In the above-described first and second embodiments, the configuration is such that specific modes (subordinate-concept modes) relating to the strobe emission are displayed as the mode menu on the display unit 16 and mode switching is performed by a tap operation. However, a configuration may be such that superordinate-concept modes are first displayed as the mode menu in the default condition and then the mode display is changed from the superordinate concept to the subordinate concept so as to perform mode switching, and an explanation will be given of this configuration as the third embodiment.

Figure 10A:
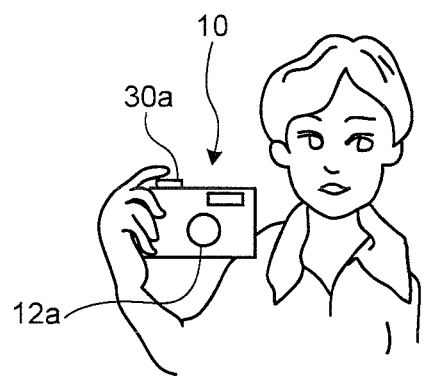
FIGS. 10A and 10B illustrate the state where the digital camera is held horizontally and the state where the digital camera is shaken fast in a counterclockwise direction from the horizontal position substantially around the shooting optical-axis direction according to a third embodiment of the present invention.
Figure 10B:
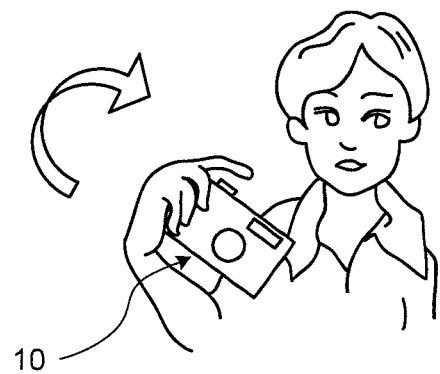

FIGS. 10A and 10B illustrate the state where the digital camera 10 is held horizontally and the state where the digital camera 10 is shaken fast in a counterclockwise direction from the horizontal position substantially around the shooting optical-axis direction, and FIG. 11A to FIG. 11D illustrate the screens of the display unit 16 in these states.

Figure 11A:
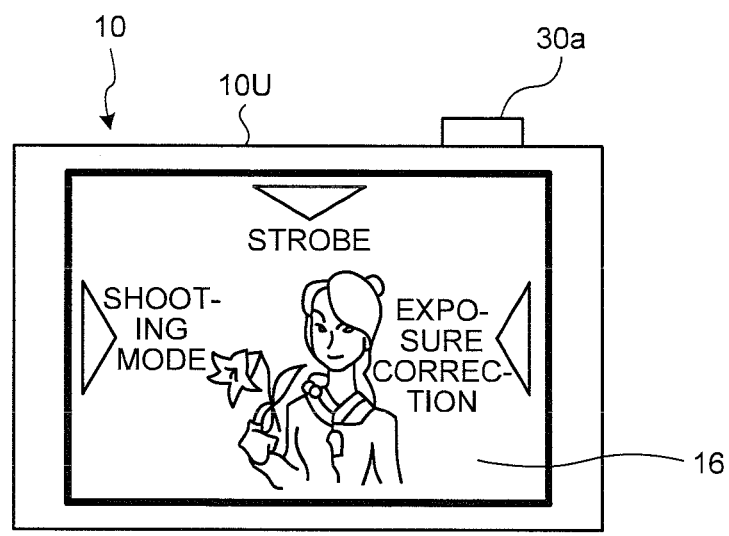
FIGS. 11A to 11D illustrate the screens of the liquid crystal display in the state where the digital camera is held horizontally and the state where the digital camera is shaken fast in a counterclockwise direction from the horizontal position substantially around the shooting optical-axis direction according to the third embodiment.

If the power switch is turned on with the digital camera 10 held horizontally, the mode menu is displayed such that the shooting mode, the strobe, and the exposure correction are displayed with triangular arrows on the left side, the upper side, and the right side of the landscape-oriented screen of the display unit 16 (see FIG. 11A).

Figure 11B:
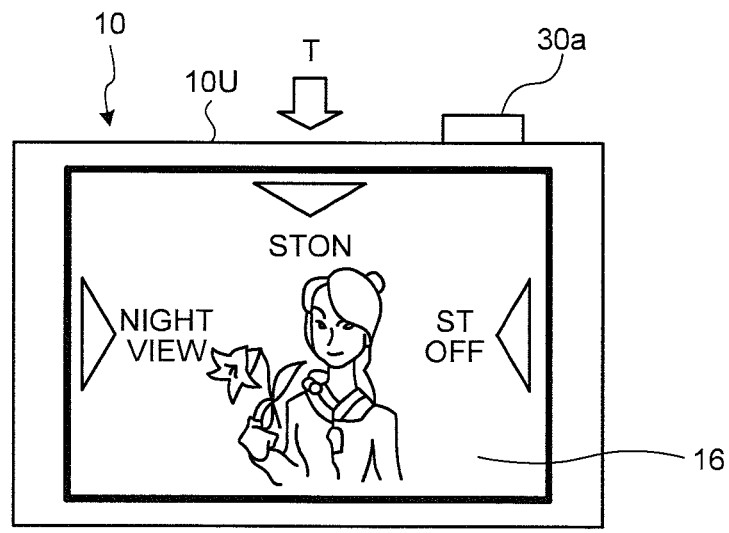

If the operation surface (the upper surface of the digital camera 10 where the release switch 30a is located) 10U is tapped in the horizontal position, the mode menu is changed and displayed such that the night view, STON, and STOFF, which are the subordinate concepts of the strobe (mode) displayed on the upper side of the screen of the display unit 16, are displayed (see FIG. 11B).

Mode switching is performed as described in the first embodiment. Specifically, if the upper surface (operation surface) 10U of the digital camera 10 is tapped, the strobe auto as the default setting is switched to the STON mode (see FIG. 3A). Furthermore, if the digital camera 10 is inclined in a clockwise direction substantially around the shooting optical-axis direction from the horizontal position so as to be in the upright position (the vertical position) and then the right side (the operation surface 10U) of the digital camera 10 is tapped, the mode is switched to the STOFF mode (see FIG. 3B). Moreover, if the digital camera 10 is inclined in a counterclockwise direction and the left side thereof is tapped, the mode is switched to the night-view mode (see FIG. 3C). That is, in the digital camera 10, the mode is switched to the mode with the triangular arrow in the direction that corresponds to the direction of the tap applied to the upper surface 10U.

Furthermore, if the digital camera 10 is shaken substantially around the shooting optical-axis direction from the horizontal position, the modes in the mode menu are displayed by being moved (shifted) one by one in accordance with the shake direction, as described in the second embodiment.

Figure 11C:
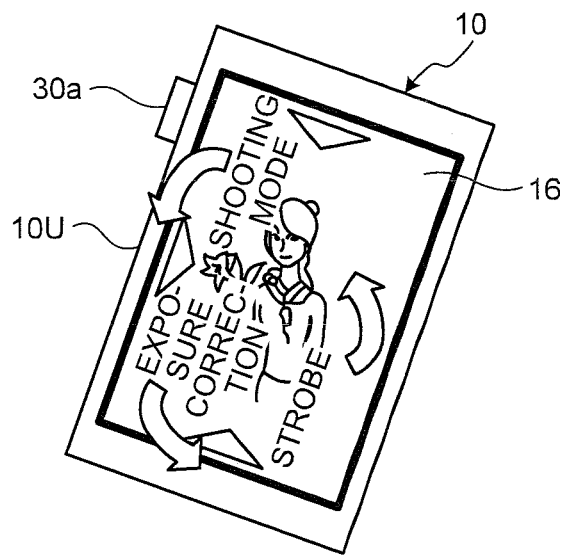

Specifically, as illustrated in FIG. 10B, if it is shaken in a counterclockwise direction (as viewed from the photographer) substantially around the shooting optical-axis direction, the shooting mode, the strobe, and the exposure correction are displayed by being moved in the shake direction (the counterclockwise direction), as illustrated in FIG. 11C. According to the third embodiment, because the display on the lower side of the screen of the display unit 16 is omitted, the shooting mode displayed on the left side is displayed on the right side with the display on the lower side skipped.

If the upper surface (the operation surface) 10U of the digital camera 10 is tapped after the digital camera 10 is shaken to change and display the modes and returned to the horizontal position, specific correction values of the exposure, which are subordinate concepts of the exposure correction, are displayed.

Figure 12A:
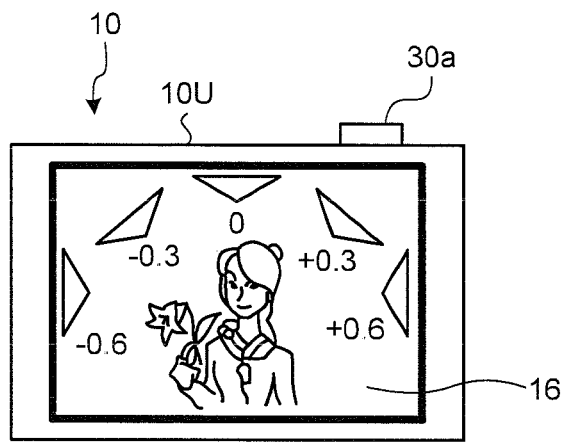
FIGS. 12A to 12C illustrate the screens of the liquid crystal display in the states where the digital camera is held horizontally, inclined at 45 degrees, and held vertically according to the third embodiment.
Figure 12B:
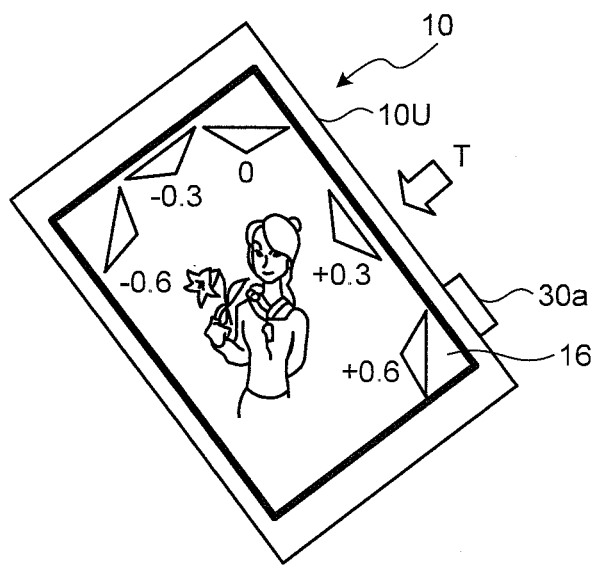
Figure 12C:
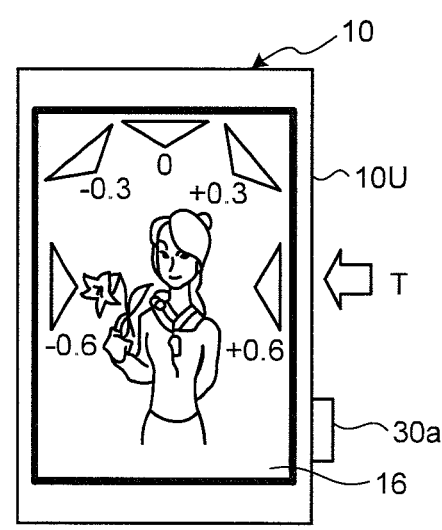

FIG. 12A to FIG. 12C illustrate the screens of the display unit 16 in the states where the digital camera 10 is held horizontally, inclined at 45 degrees, and held vertically.

Five correction values (they are also treated as the modes), i.e., for example, −0.6, −0.3, 0, +0.3, and +0.6, are displayed as the correction values of the exposure such that they are 45 degrees apart from one another on the landscape-oriented screen of the display unit 16 when the digital camera 10 is held horizontally, as illustrated in FIG. 12A.

FIG. 12B is a diagram that illustrates the digital camera 10 when it is inclined at 45 degrees from the horizontal position in a clockwise direction as viewed from the photographer so that the upper surface (the operation surface) 10U where the release switch 30a is located is an inclined surface at 45 degrees to the right. If the upper surface (the inclined surface) 10U is tapped in the state illustrated in FIG. 12B, the correction value of the exposure is switched from the correction value of 0 as the default setting to the correction value of +0.3, which corresponds to the upper surface (the inclined surface) 10U on the screen of the display unit 16.

Specifically, the mode is switched, as the correction value of the exposure, to the correction value of +0.3, which is a value for which the direction of the corresponding arrow on the screen of the display unit 16 is identical to the tap direction.

As illustrated in FIG. 12C, if the digital camera 10 is further inclined at 45 degrees in the clockwise direction to be in the vertical position, the upper surface (the operation surface) 10U of the digital camera 10 is a vertical surface and the correction value of +0.6 is displayed on the right side of the screen of the display unit 16 corresponding to the surface. Then, if the upper surface (the operation surface) 10U is tapped in the vertical position, the correction value of the exposure is switched to the value of +0.6.

As described above, the position change (inclination) of the digital camera 10 is detected by the position-change detecting unit 26, and the detection result is output to the central processing circuit 14. Then, the correction value of +0.3, if the digital camera 10 is inclined at 45 degrees in a clockwise direction, or the correction value of +0.6, if inclined at 90 degrees, is displayed under the control of the central processing circuit 14 on the screen of the display unit 16, which corresponds to the upper surface (the operation surface) 10U of the digital camera 10.

Although an explanation is given of an inclination in a clockwise direction (as viewed from the photographer) in FIG. 12, the same applies to an inclination in a counterclockwise direction. Specifically, the correction value of −0.3, if inclined at 45 degrees in a counterclockwise direction from the horizontal position, or the correction value of −0.6, if inclined at 90 degrees, is displayed on the screen of the display unit 16 corresponding to the upper surface (the operation surface) 10U of the digital camera 10. Then, if the upper surface (the operation surface) 10U of the digital camera 10 is tapped at the position change location (the inclined location), the correction value of the exposure is switched to the correction value of −0.3 or −0.6.

FIG. 13A to FIG. 13D illustrate the screens of the display unit 16 in the state where the digital camera 10 is shaken fast in a counterclockwise direction from the horizontal position substantially around the shooting optical-axis direction.

Figure 11D:
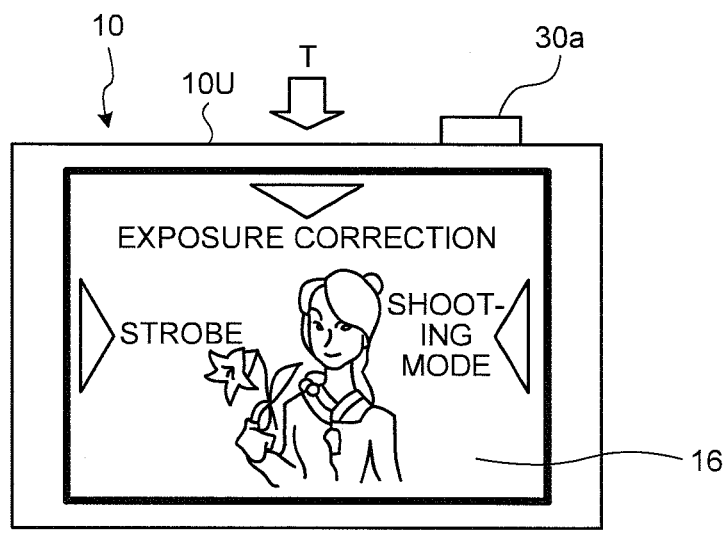
Figure 13A:
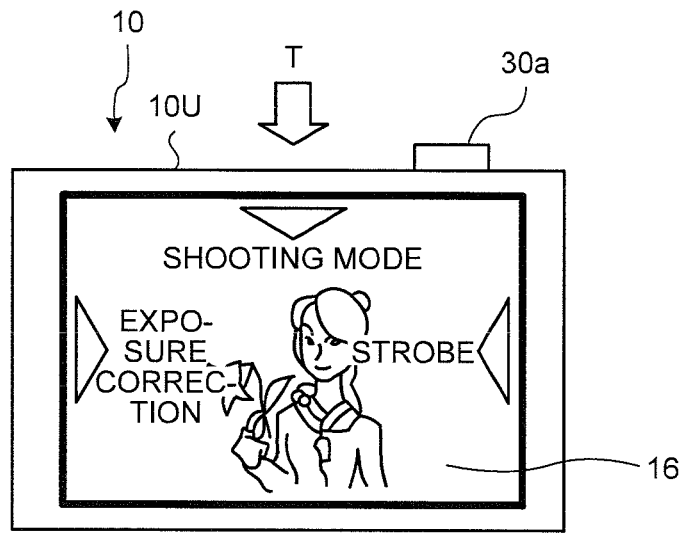
FIGS. 13A to 13D illustrate the screens of the crystal liquid display in the state where the digital camera is shaken fast in a counterclockwise direction from the horizontal position substantially around the shooting optical-axis direction.

If the digital camera 10 is shaken in a counterclockwise direction in FIG. 11D, the exposure correction as the mode menu is moved and displayed on the left side of the screen of the display unit 16, the shooting mode as the mode menu is moved and displayed on the upper side of the screen, and the strobe as the mode menu is moved and displayed on the right side of the screen as illustrated in FIG. 13A.

Figure 13B:
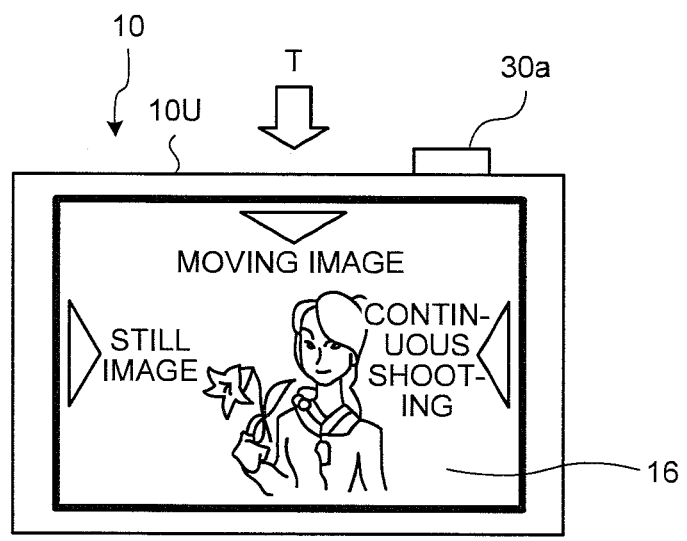
Figure 13C:
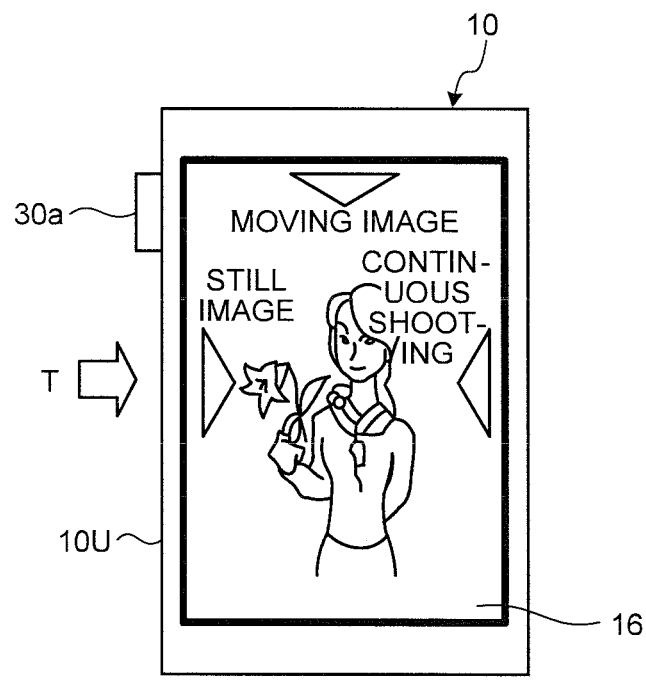

If the upper surface (the operation surface) 10U of the digital camera 10 is tapped in FIG. 13A, the subordinate-concept modes, for example, still-image, moving-image, and continuous-shooting modes, of the shooting mode, which corresponds to the tap direction, are displayed on the left side, the upper side, and the right side of the screen of the display unit 16, respectively (see FIG. 13B).

Then, if the upper surface (the operation surface) 10U of the digital camera 10 in the horizontal position as illustrated in FIG. 13B is tapped, the mode is switched to the moving-image mode (from the still-image mode as the default setting) that is displayed on the display unit 16 corresponding to the upper surface 10U. Afterwards, if the upper surface (the operation surface) 10U of the digital camera 10 is tapped after the digital camera 10 returns to the horizontal position and is inclined at 90 degrees in a counterclockwise direction, the mode is switched to the still-image mode that is displayed on the left side of the screen of the display unit 16 corresponding to the upper surface 10U, whereby the shooting of still images can be performed (see FIG. 13C).

Figure 13D:
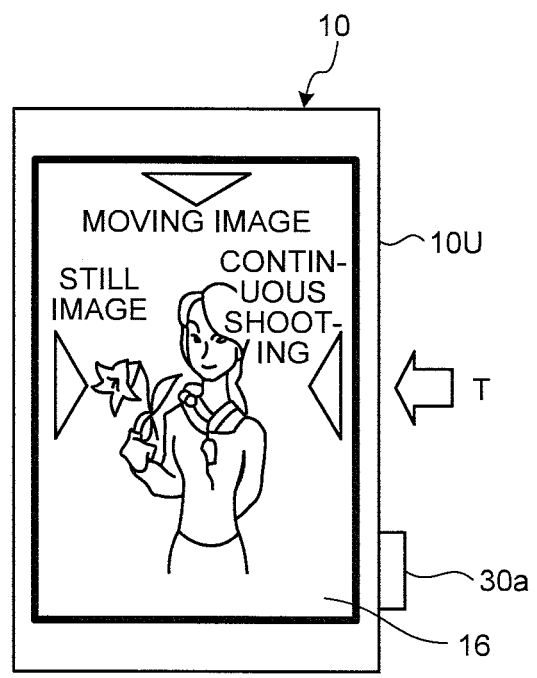

Moreover, if the upper surface (the operation surface) 10U of the digital camera 10 is tapped after the digital camera 10 is inclined at 90 degrees in a clockwise direction from the horizontal position illustrated in FIG. 13B, the mode is switched to the continuous-shooting mode (from the still-image mode as the default setting) that is displayed on the right side of the screen of the digital camera 10 corresponding to the upper surface (the operation surface) 10U, whereby the continuous shooting can be performed (see FIG. 13D).

Thus, if a configuration is such that the display of the mode menu is changed from the superordinate-concept modes to the subordinate-concept modes and mode switching is performed in the subordinate-concept mode menu, it is possible to perform the mode change over a wide range by one-handed operation such as shake or tap in a quick and easy manner.

Obviously, because the related modes are collectively displayed in the subordinate-concept mode menu, it is possible to perform the mode change to set the most appropriate mode for an object, a shooting intension, or the like, in a quick and easy manner and perform the shooting under the most suitable condition without losing a photo opportunity.

According to the present invention as described above, because the mode is switched over in accordance with the position change of the imaging device or the direction of an operation applied to the imaging device, mode switching can be performed by one-handed operation. Because the mode menu is displayed on the display unit so as to display a number of switchable modes, it is possible to switch to the desired mode in a quick manner.

Mode switching can be performed by tap and the mode can be changed and displayed by shake. If the mode is changed from the superordinate concept to the subordinate concept and displayed, the mode change can be performed over a wide range.

If the acceleration sensor is the operation detecting unit, the control unit determines the operation direction in accordance with the detected waveform or amplitude so that mode switching can be performed in an easy manner. Furthermore, if a configuration is such that the operation detecting unit that is the acceleration sensor also functions as the position-change detecting unit, the position-change detecting unit can be omitted.

If the operation detecting unit includes three acceleration sensors that detect the accelerations in the X axial direction, the Y axial direction, and the Z axial direction, the direction of the acceleration can be detected in the three dimensions and the direction of the acceleration can be correctly determined.

The above-described embodiments are given to explain the present invention, the present invention is not limited to these embodiments, and it is obvious that modification, conversion, or the like, within a technical range of the present invention can be included in the present invention.

For example, the above-described embodiments have a configuration that the upper surface 10U of the digital camera 10 where the release switch 30a is located is the operation surface and, if the operation detecting unit 28 detects tap applied to the upper surface 10U, mode switching is performed. However, the surface (the operation surface) that detects an effective tap is not limited to the upper surface of the digital camera 10 and may be the right surface, the left surface, the lower surface, the front surface, or the back surface (of the digital camera when located in the horizontal position). Furthermore, the operation surface is not limited to one surface, and a plurality of surfaces may be operation surfaces.

Moreover, although it is possible that the operation detecting unit 28 detects acceleration (vibration) produced by tap and the position-change detecting unit (the position-change detecting unit if the operation detecting unit also functions as the position-change detecting unit) detects the position change of the digital camera caused by shake, or the like, so that mode switching is performed, it is preferable to arrange a menu key such as a cross-shaped button, a decision key (OK key), a zoom button, or a switch (mode switch), such as a reproduction button, for mode switching.

If a mode switch is arranged, mode switching can be performed by operating the mode switch instead of performing mode switching by tap, whereby it is possible to select mode switching that can be performed by one-handed operation according to the present invention and mode switching performed by a conventional switch operation.

Furthermore, a combination and an arrangement of modes in a mode menu displayed on the display unit 16 and the mode display changed by shake are illustrated as examples, and they are not limited to the ones illustrated in the embodiments.

To facilitate better understanding of the invention, the position-change detecting unit 26 and the operation detecting unit 28 of the embodiments described above detect the inclination (including shake) and the tap direction of the digital camera 10, respectively, by using the horizontal position of the digital camera 10 as the initial position. However, the initial position, which is a reference used for detecting the inclination and/or the tap direction, may be variable depending on the shooting optical-axis direction of the digital camera 10 and/or may be set by the user. For example, when the user directs the shooting lens at a flower on the ground, the initial position is set with the shooting optical-axis direction being downward.

Although the imaging device is embodied as a digital camera in the embodiments, the imaging device that is a target of the present invention is not limited to a digital camera, and the imaging device according to the present invention includes, for example, a mobile phone that has a digital camera function, a mobile device with a digital camera, such as a laptop computer, or the like, as well as a digital video camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for switching a mode of an imaging device, the imaging device including an imaging unit that takes an image and a display unit that displays the image taken by the imaging unit, the method comprising:
   detecting a position of the imaging device;
   displaying a menu of selectable modes on the display unit in a switchable manner;
   detecting a position or a direction of an operation applied to the imaging device;
   switching a mode in accordance with a correspondence between the detected position or direction of the operation and the menu displayed on the display unit;
   displaying the menu of the selectable modes on the display unit independently of a change in the position of the imaging device,
   wherein the operation is tap, and
   the detecting the position or the direction of the operation includes detecting acceleration of the imaging device and determining a position or a direction of the tap in accordance with the acceleration, the method further comprising:
   switching to a mode corresponding to the position or the direction of the tap among the modes displayed on the display unit;
   detecting the position of the imaging device substantially around a shooting optical-axis direction in accordance with acceleration or gravity applied to the imaging device; and
   changing display positions of the selectable modes on the display unit in accordance with the detected position.

2. A method for switching a mode of an imaging device, the imaging device including an imaging unit that takes an image and a display unit that displays the image taken by the imaging unit, the method comprising:

detecting a position of the imaging device;
displaying a menu of selectable modes on the display unit in a switchable manner;
detecting a position or a direction of an operation applied to the imaging device; and
switching a mode in accordance with a correspondence between the detected position or direction of the operation and the menu displayed on the display unit,
wherein the operation is tap, and
the displaying includes displaying a menu of superordinate-concept modes as the selectable modes in a default condition on the display unit, and
the method further comprises
detecting a position of the imaging device substantially around a shooting optical-axis direction in accordance with acceleration or gravity applied to the imaging device;
changing display positions of the selectable modes on the display unit in accordance with the detected position;
if the tap is applied to the imaging device in a state where the menu of the superordinate-concept modes is displayed on the display unit, displaying on the display unit, among the menu of the modes displayed on the display unit, a menu of subordinate-concept modes of a mode that corresponds to a position or a direction of the tap; and
if the tap is applied to the imaging device in a state where the menu of the subordinate-concept modes is displayed on the display unit, switching to a mode that corresponds to the position or the direction of the tap.

* * * * *